United States Patent
Maillard et al.

(12) 
(10) Patent No.: US 6,714,650 B1
(45) Date of Patent: Mar. 30, 2004

(54) RECORDING OF SCRAMBLED DIGITAL DATA

(75) Inventors: Michel Maillard, Maintenon (FR); Christian Benardeau, Bussy Saint Georges (FR)

(73) Assignee: Canal + Societe Anonyme (FR)

( * ) Notice: Subject to any disclaimer, the term of this patent is extended or adjusted under 35 U.S.C. 154(b) by 0 days.

(21) Appl. No.: 09/622,138

(22) PCT Filed: Feb. 12, 1999

(86) PCT No.: PCT/IB99/00328
§ 371 (c)(1),
(2), (4) Date: Aug. 11, 2000

(87) PCT Pub. No.: WO99/41874
PCT Pub. Date: Aug. 19, 1999

(30) Foreign Application Priority Data

Feb. 13, 1998 (FR) .......................................... 98400344

(51) Int. Cl.⁷ ........................ H04N 7/167; H04N 7/173; G07F 7/10
(52) U.S. Cl. ...................... 380/231; 380/210; 380/211; 380/230; 380/239; 705/51; 705/52; 705/55; 705/58
(58) Field of Search ................................ 380/210, 211, 380/228, 230, 231, 233, 236, 237, 239, 240, 241, 279, 280, 281; 705/51, 52, 55, 56, 58; 713/162, 163

(56) References Cited

U.S. PATENT DOCUMENTS 5,636,276 A  *  6/1997  Brugger ....................... 705/54
5,701,343 A  * 12/1997  Takashima et al. ........... 705/51
5,991,400 A  * 11/1999  Kamperman ................ 380/239

FOREIGN PATENT DOCUMENTS

| EP | 0 678 851 A1 | 10/1995 | |
| EP | 0678851 A1 * | 10/1995 | ............ H04N/7/16 |
| EP | 0 763 936 A2 | 3/1997 | |
| EP | 0763936 A2 * | 3/1997 | ............ H04N/5/913 |
| WO | 97/49238 | 12/1997 | |
| WO | WO 9749238 A1 * | 12/1997 | ............ H04N/5/91 |

* cited by examiner

*Primary Examiner*—Justin T. Darrow
(74) *Attorney, Agent, or Firm*—Rosenthal & Osha L.L.P.

(57) ABSTRACT

A system for transmitting and recording digital data is included. Further, a system for transmitting transmit scrambled audio data that is to be recorded on a mini disc reader is included. A system for transmission and recording of digital data includes transmission means adapted to prepare and transmit scrambled digital data together with at least one encrypted control word and a digital recording device adapted to receive and record the scrambled digital data and encrypted control word on a digital support. The digital recording device further includes an access control means adapted to decrypt the control word and thereafter descramble the digital data during playback.

19 Claims, 6 Drawing Sheets

Fig.4.

| HEADER DATA | EMM (Title,ReaderID) | AUDIO DATA / ECM | ... | AUDIO DATA / ECM |

Fig.6.

| HEADER DATA | EMM (ReaderID,Month) | AUDIO DATA / ECM | ... | AUDIO DATA / ECM |

Fig.8.

| HEADER DATA | AUDIO DATA / ECM | ... | AUDIO DATA / ECM |

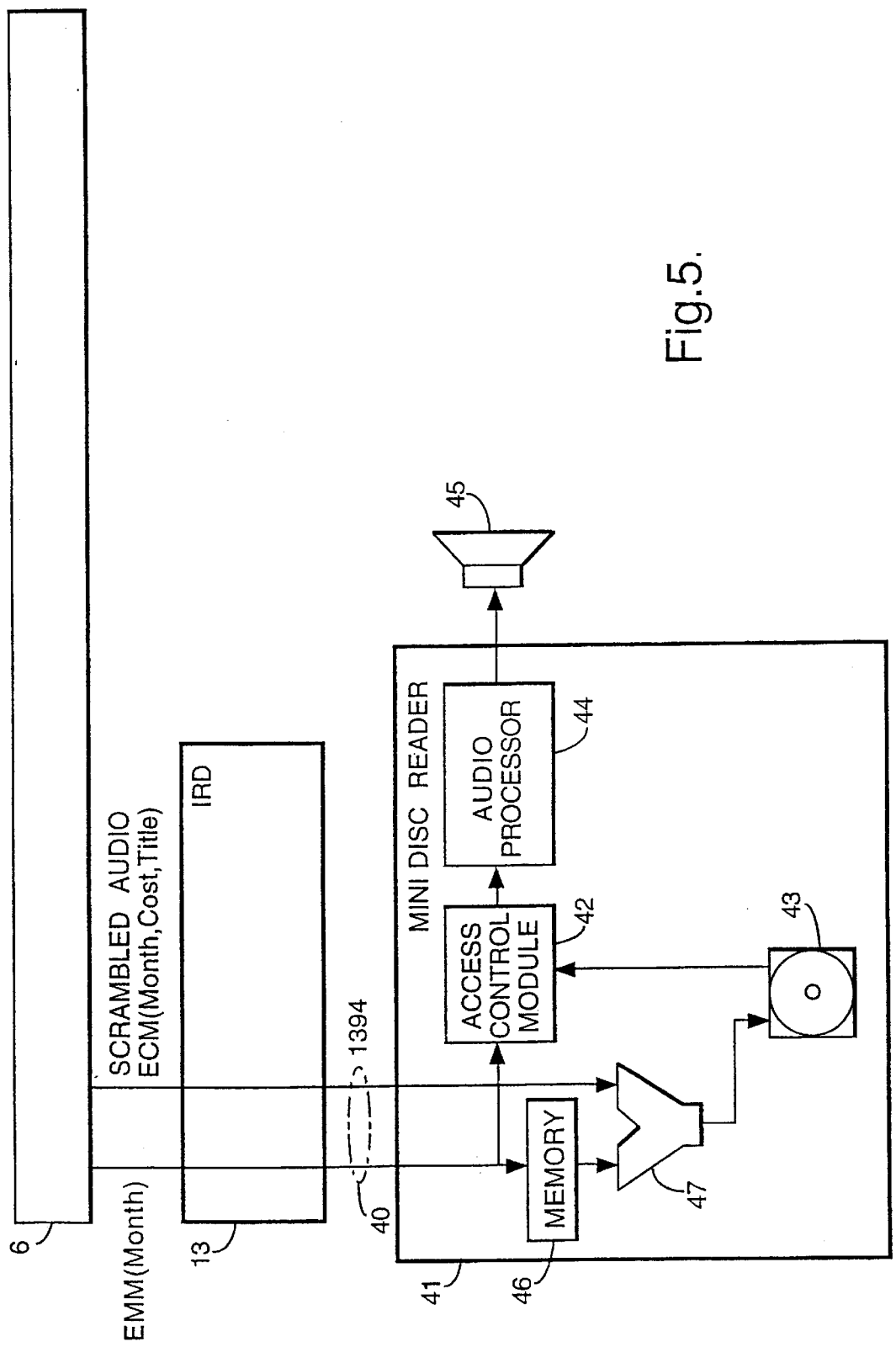

RECORDING OF SCRAMBLED DIGITAL DATA

The present invention relates to a method and apparatus for transmission and recording of scrambled digital data, for example broadcast audio and/or visual data.

Transmission of scrambled or encrypted digital data is well-known in the field of pay. TV systems, where scrambled audiovisual information is broadcast e.g. by satellite to a number of subscribers, each subscriber possessing a decoder or receiver/decoder capable of descrambling the transmitted program for subsequent viewing.

In a typical conditional access system for pay TV, scrambled digital data is transmitted together with a control word for descrambling the digital data, the control word itself being encrypted by a first key and transmitted in encrypted form in an ECM message. The scrambled digital data and encrypted code word are received by a decoder possessing an equivalent of the first key necessary to decrypt the encrypted control word and thereafter descramble the transmitted data. Usually, the control word changes every 10–15 seconds. A paid-up subscriber will receive on a monthly basis an EMM message including the exploitation key necessary to decrypt the encrypted control words so as to permit viewing of the broadcast programs.

With the advent of digital technology, the quality of the transmitted data has increased many times over. A particular problem associated with digital quality data lies in its ease of reproduction. Where a descrambled program is passed via an analogue link (e.g. the "Peritel" link) for viewing and recording by a standard VCR the quality remains no greater than that associated with a standard analogue cassette recording. The risk that such a recording may be used as a master tape to make pirate copies is thus no greater than with a standard shop-bought analogue cassette.

By way of contrast, any descrambled digital data passed by a direct digital link to one of the new generation of digital recording devices (for example, a DVHS recorder) will be of the same quality as the originally transmitted program. It may thus be reproduced any number of times without any degradation of image or sound quality. There is therefore a considerable risk that the descrambled data will be used as a master recording to make pirate copies, either further digital copies or even simple analogue VHS copies.

PCT/US97/07981, which represents the closest prior art document, discloses a system of copyright control, in which authorisation messages are included with a broadcast program. A receiver/decoder makes a decision to record the program or not based on this message, the program usually being recorded in clear on the video cassette. The system operates in parallel with a conventional conditional access system and in all embodiments the transmitted scrambled program is descrambled in the decoder before being recorded.

EP 0763936 discloses another method of copyright control, again using a system of authorisation messages in parallel with a conventional access control system. In order to permit replaying of a scrambled recording after the end of a subscription month (and a subsequent change in exploitation key), the system stores that month's EMM message in the smart card of the decoder. This may lead to significant information storage problems in the smart card.

It is an object of the present invention to enable a secure system for transmission and recordal of data permitting authorised recording of transmitted digital data, whilst minimising the risk of pirate copies of such recordings being made by unauthorised third parties and avoiding the problems with the known systems.

According to the present invention there is provided a system for transmission and recording of digital data, comprising a transmission means adapted to prepare and transmit at least one control word encrypted by a first key together with digital data scrambled by that control word characterised in further comprising a digital recording device adapted to receive and record the transmitted scrambled digital data together with the encrypted control word on a digital support, the digital recording device further including an access control unit adapted to decrypt the control word and thereafter descramble the digital data during playback.

In this way, the data in question will be recorded in the scrambled form in which it was transmitted directly on the digital support medium, and may only be accessed thereafter in conjunction with the recording device and associated access control unit, thereby providing a secure system for recordal whilst avoiding the problems with the known methods.

The access control unit may be permanently integrated in the recording device. However, in some embodiments it may be envisaged that the access control unit is incorporated in a discrete module, for example as a smart card on SIM card, insertable in the recording device to permit decryption and descrambling of the recorded data upon playback.

Whilst the recording device may include the means necessary to receive the transmitted digital data, the system may also comprise a separate receiver/decoder adapted to receive the transmitted digital data and encrypted code word and to communicate this information to the recording device for subsequent recordal.

In this embodiment, the receiver/decoder may be a standard type as known from the field of digital television broadcast and adapted to receive broadcast audio and/or visual data (scrambled and in clear) as well as data sent, for example, via a modem link to the receiver/decoder. The receiver/decoder may also be integrated with other devices such as digital television, DVHS recorder etc.

Broadly speaking, the system may function in two possible modes of operation; a cyclical transmission mode and a transmission on demand mode. In the case of a cyclical transmission mode, the transmission means is adapted to repetitively transmit the scrambled digital data and encrypted code word.

In such a mode, the control word for the data is preferably encrypted by a first key associated with the identity of the data being transmitted. For example, in the case where a number of pieces of music are being transmitted in a repeating cycle, the control word or words needed to descramble the data for each recording are encrypted by a key specific to that particular piece of music. The number of control words needed may depend on the length of the piece of music.

The equivalent of the key needed to decrypt the control word may be communicated to the access control means in a number of ways, for example, simply by transmission "in clear" over a telephone network or the like. Preferably, however, the first key is encrypted by a second key before communication to the access control unit.

In such an embodiment, the system may further comprise a key encryption apparatus adapted to encrypt the equivalent first key by a second key before communication to the recording device, the access control unit possessing an equivalent of the second key so as to permit the decryption of the first key and, thereafter, the decryption of the control word and subsequent descrambling of the transmitted data The key encryption apparatus may be integrated with the transmission means and the associated circuitry for scrambling the transmission etc. However, it may equally be associated with a separate database and server containing a list of keys associated with each access control means and recording device.

In the case where the system comprises a receiver/decoder unit, the receiver/decoder unit may be adapted to request a first key from the key encryption apparatus, the key encryption apparatus thereafter transmitting the encrypted first key to the receiver/decoder for subsequent communication to the recording device and access control module.

For example, the key encryption apparatus may respond to a request received from the receiver/decoder via a modem channel by returning information on this channel. Alternatively, the information may be communicated to the transmission means for subsequent communication, for example, in a broadcast transmission.

The above cyclical transmission embodiments have been discussed in particular in relation to systems in which the key used to encrypt the control word is directly associated with the identity of the data e.g. the particular piece of music or audiovisual programme transmitted.

In an alternative embodiment, the same first key is used to encrypt the control word or words associated with a plurality of sets of data For example, all programmes or songs transmitted during a particular period of time, such as during a month's subscription, may use the same first encryption key to encrypt control word data.

Similarly, whilst the first key is normally sent in response to a request from a user, in one embodiment the first key is repetitively transmitted by the transmission means in a message encrypted by a second key.

The verification that the user or subscriber has sufficient rights to receive and record, for example, a month's worth of data may be handled upstream at the transmission. Only those subscribers having paid the necessary subscription will receive the key for that month, as encrypted by their personalised second key and sent by the transmission means.

In addition, in some embodiments, the access control module may further include a credit unit for controlling the number of recordings made by the recorder and/or the number of times a recording is replayed, for example, during a month's worth of credit In this case, a number of credits may be communicated, for example, together with the first key information to the recorder device each month, each recording resulting in the reduction of a credit held by the recording device.

The above embodiments have been discussed in relation to a cyclical mode of transmission. In an alternative on-demand mode, the transmission means responds to a real-time request to transmit the scrambled digital data and encrypted control word.

Whilst being more complicated to manage in terms of the received requests, the on-demand embodiment may permit a simplification of the encryption process. In particular, in one embodiment, the control word is directly encrypted by a first key associated with the identity of the access control unit, the access control unit possessing an equivalent of this key to permit the decryption of the control word and subsequent descrambling of the data.

The real-time request may be communicated to the transmission means by a receiver/decoder connected to the recording device. Alternatively, a request may be made by telephone, minitel etc.

The transmission means may be adapted to transmit data to the recorder via any number of communication channels, for example, via a fixed telecommunications network. However, the invention is particularly applicable to broadcast transmission of primarily audiovisual or multimedia digital data, notably audio data. The present invention may also be used in conjunction with many types of digital recording devices.

In one preferred embodiment, the transmission means is adapted to transmit digital audio data In such an embodiment, the recording device may conveniently comprise a mini disc recorder adapted to include access control means as described above.

The present invention equally extends to a recording device for use in a system as described above and a method of transission and recording of scrambled data.

The terms "scrambled" and "encrypted" and "control word" and "key" have been used at various parts in the text for the purpose of clarity of language. However, it will be understood that no fundamental distinction is to be made between "scrambled data" and "encrypted data" or between a "control word" and a "key". Similarly, the term "equivalent key" is used to refer to a key adapted to decrypt data encrypted by a first mentioned key, or vice versa. Unless obligatory in view of the context or unless otherwise specified, no general distinction is made between keys associated with symmetric algorithms such as DES and those associated with public/private algorithms such as RSA.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser or integrated with other devices such as a video recorder or a television.

Similarly, the term "digital recording device" may designate any suitable device adapted for recording digital data, notably audio and/or visual data, such as DAT machine, a DVD recorder, a DVHS recorder, a mini disc recorder etc.

As used herein, the term "transmission means" includes any transmission system for transmitting or broadcasting for example primarily audiovisual or multimedia digital data. Whilst the present invention is particularly applicable to broadcast digital audio or television systems, the invention may also be applicable to a fixed telecommunications network for multimedia internet applications, to a closed circuit television, and so on.

In the case of a broadcast audio or television system, the transmission route may include satellite, terrestrial, cable or other medium.

Other general and preferred features of the various aspects of the invention will be apparent from the description of the various exemplary embodiments. In this regard, there will now be described, by way of example only, a number of embodiments of the present invention, with reference to the attached figures, in which:

FIG. 4 shows the recorded data associated with the embodiment of FIG. 3;

FIG. 5 shows a second embodiment of the invention adapted to use the principle of a series of prepaid tokens;

FIG. 6 shows the recorded data associated with the embodiment of FIG. 5;

FIG. 8 shows the recorded data associated with the embodiment of FIG. 7.

In the embodiments of FIGS. 3 to 8, the present invention will be discussed in relation to the broadcast transmission of scrambled data and its subsequent recordal. A digital television system and decoder for use in such a context will now be described in relation to FIGS. 1 and 2.

Figure 1:
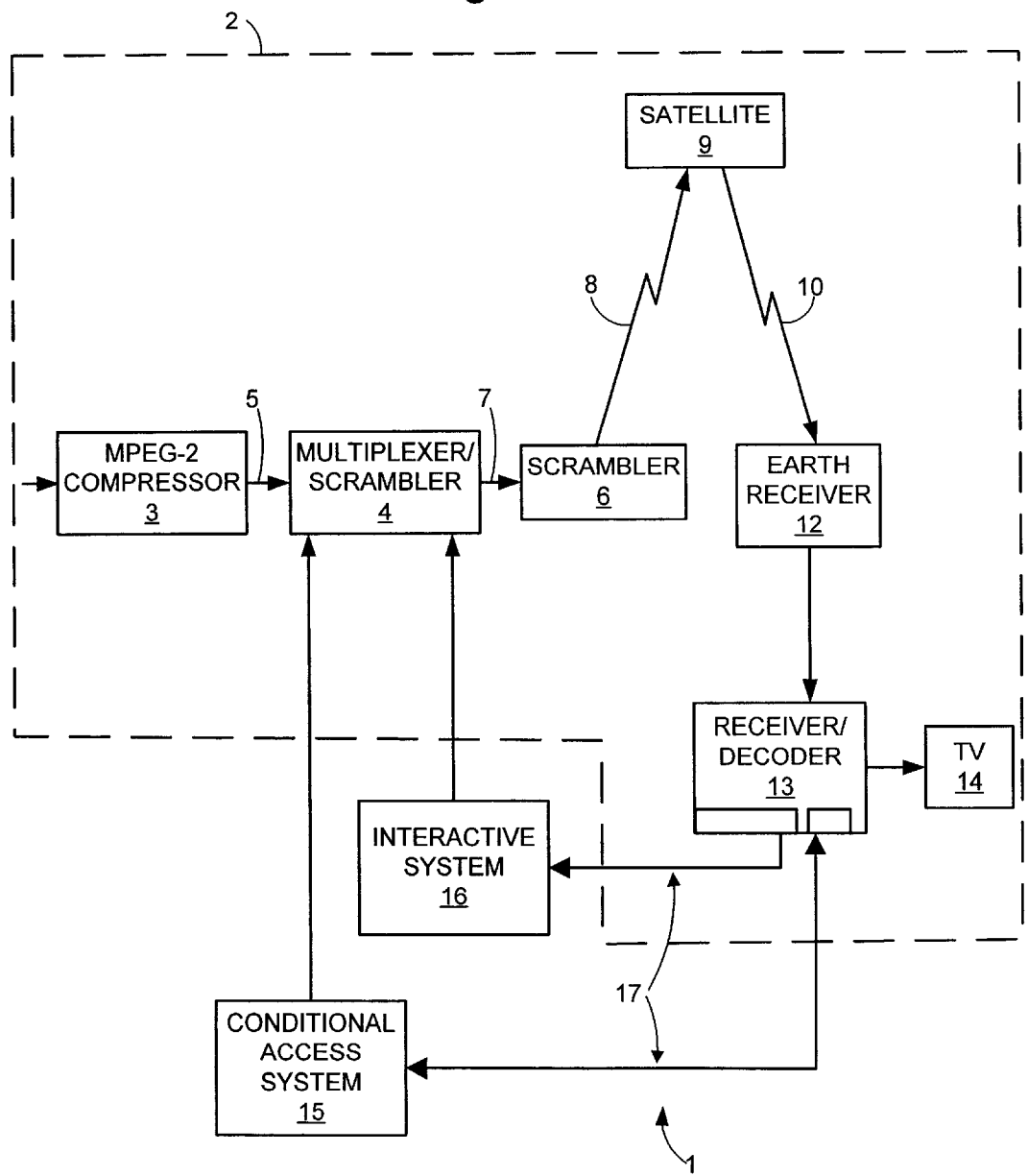
FIG. 1 shows an overview of a digital television system adaptable for use in the present invention.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including teleconmnunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television prograrnmes sold by the broadcast supplier), can be inserted into the receiver/decoder 13. Using the decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form in an ECM (Entitlement Control Message).

The scrambled data and encrypted control word are then received by the decoder 13 having access to an equivalent of the exploitation key stored on a smart card inserted in the decoder to decrypt the encrypted ECM and control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
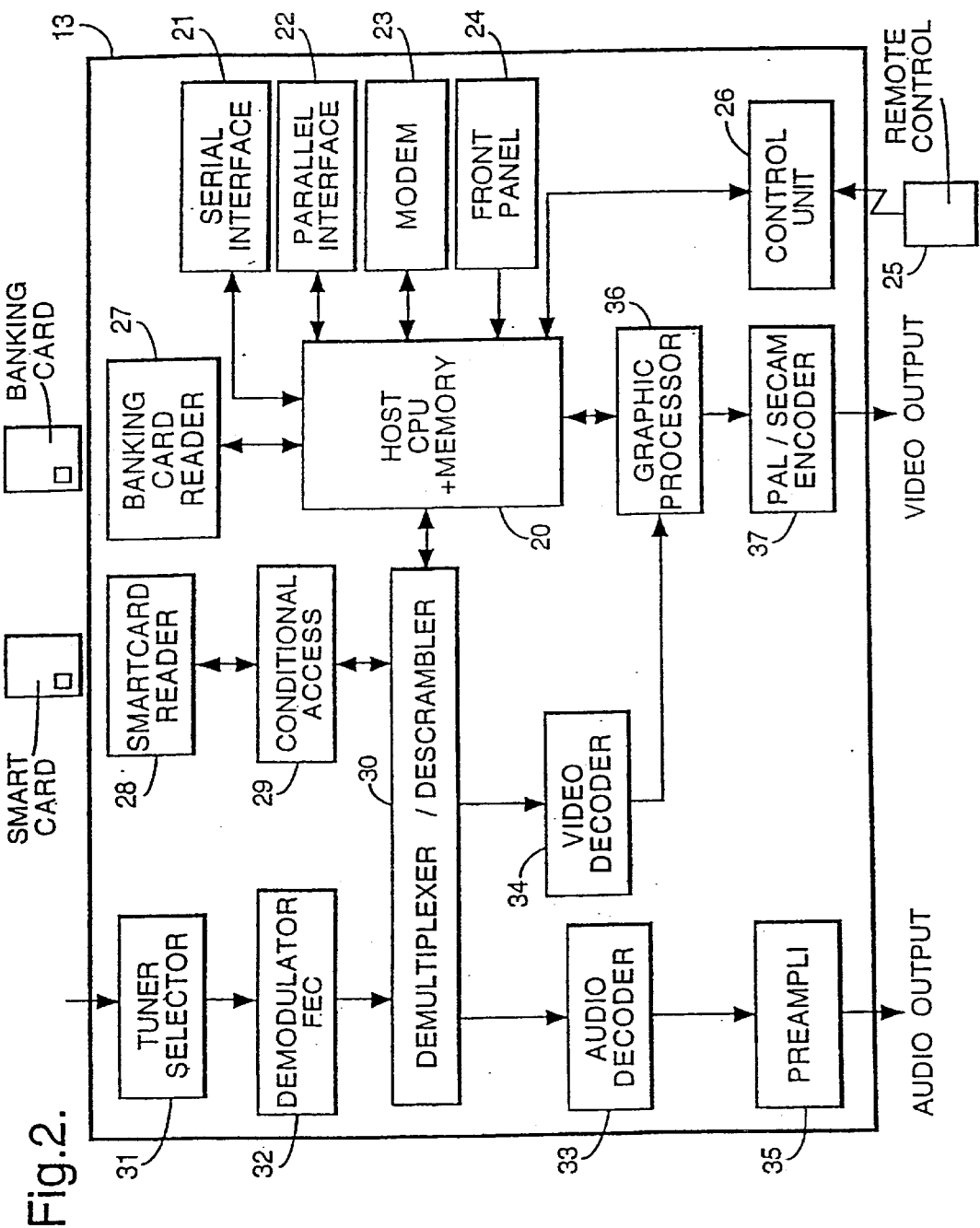
FIG. 2 shows the elements of the receiver/decoder of FIG. 1.

Referring to FIG. 2, the elements of the receiver/decoder 13 or set-top box adapted to be used in the present invention will now be described. The elements shown in this figure will be described in terms of functional blocks.

The decoder 13 comprises a central processor 20 including associated memory elements and adapted to receive input data from a serial interface 21, a parallel interface 22, a modem 23 (connected to the modem back channel 17 of FIG. 1), and switch contacts 24 on the front panel of the decoder.

The decoder is additionally adapted to receive inputs from an infra-red remote control 25 via a control unit 26 and also possesses two smartcard readers 27, 28 adapted to read bank or subscription smartcards 29, 30 respectively. The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. The software architecture of the central processor may correspond to that used in a known decoder and will not be described here in any detail. It may be based, for example, on a virtual machine interacting via an interface layer with a lower level operating system implemented in the hardware components of the decoder. In terms of the hardware architecture, the decoder will be equipped with a processor, memory elements such as ROM, RAM, FLASH etc. as in known decoders.

In the case of received audio and video signals, and as will be described in more detail below, the MPEG packets containing these signals will be demultiplexed and filtered so as to pass real time audio and video data in the form of a packetised elementary stream (PES) of audio and video data to dedicated audio and video processors or decoders 33, 34. The converted output from the audio processor 33 passes to a preamplifier 35 and thereafter via the audio output of the receiver/decoder. The converted output from the video processor 34 passes via a graphic processor 36 and PAL/SECAM encoder 37 to the video output of the receiver/decoder.

The graphic processor 36 additionally receives graphic data for display (such as generated images etc) from the central processor 20 and combines this information with information received from the video processor 34 to generate a screen display combining moving images together with overlaid text or other images.

In the case of received teletext and/or subtitle data, the conversion of the real time PES data to generate the appropriate images may also be handled by dedicated processors. However, in most conventional systems, this is handled by the general processor 20.

The system described above in relation to FIGS. 1 and 2 has been set out in relation to the broadcast and reception of television data. As will now be described, the system is equally adaptable to the broadcast, for example, of exclusively audio data, the decoder functioning in this case as a digital radio receiver. In the examples of the various embodiments of the invention that will now be described, the decoder functions largely as a simple channel for reception and communication of data to a recording device. Data may also be communicated to the recording device via other networks, such as fixed telecom networks or the like.

Whilst the following description concentrates on recordal of audio data, the same principles may be easily applied to audiovisual or other digital multimedia data transmitted and received for example via the decoder. Similarly, whilst the embodiment will be discussed in particular in relation to a mini disc reader/recorder device, the same principles may be applied to DVHS readers, CD ROM devices, etc. The receiver/decoder may itself integrate such recording devices.

Figure 3:
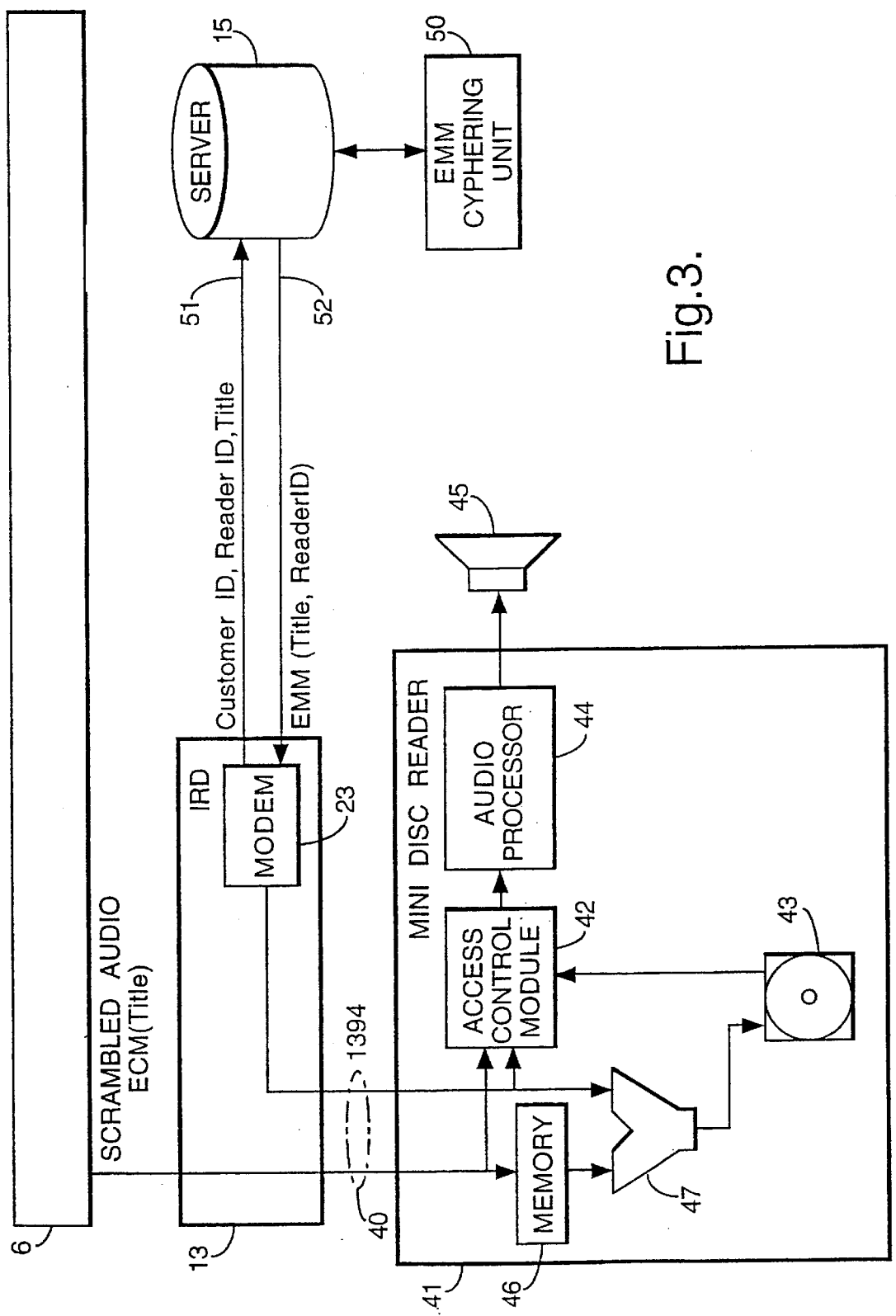
FIG. 3 shows a first embodiment of the invention including a recording device for recording transmitted scrambled data.

Referring now to FIG. 3, the decoder 13 is connected, via a IEEE 1394 bus 40 to a digital recording device 41, such as a mini disc reader, adapted to receive and record audio information received by the decoder 13. The device 41 is further adapted to include an access control module 42, the operation of which will be described in detail below. This access control module 42 corresponds in many ways to the smartcard and conditional access module 29 normally used to descramble broadcast television transmissions. Specifically, encrypted audio data recorded on a digital recording support in the form of a mini disc 43 is descrambled by the access control module 42 and passed to an audio processor 44 before eventual output to a pair of headphones or loudspeaker 45.

In view of the reduced data flow of audio data in comparison with a full audiovisual television signal, the access control module 42 can be realised in the form of a single chip containing all the elements necessary to receive a scrambled signal and output a clear signal, including the necessary cryptographic key or keys (see below) and associated descrambling circuitry. This chip may be integrated within the recording device 41 or may be embodied in a SIM card or similar insertable in a slot in the device.

In this embodiment, a particular title or piece of music (a song, set of songs, etc.) available to be recorded is scrambled prior to transmission by a control word. In the same manner as for a television broadcast, scrambling is carried out using a control word which changes every 10–15 seconds or so. Each control word (and other data, if desired) is encrypted using an encryption key Kt associated with the identity of the piece of music, for example the title of the song concerned, so as to form a characteristic ECM message.

The audio data and associated ECM messages are sent cyclically by the transmitter 6. That is, this data is broadcast continuously (or at least at regular intervals) to a field of decoders. In the event that a user decides to purchase this title, for example, by selecting the title from a menu of available titles using the decoder remote control, the decoder 13 sends a message 51 to the access control server 15 and ciphering unit 50. The message includes information relating to the title of the piece of music, the identity of the recording device 41 that will be used to record the data and the identity of the customer's decoder 13.

As described above, the ECM containing the control word needed to descramble the audio information is encrypted using a key associated with the title of the piece of music. The ciphering unit 50 possesses the equivalent of the key Kt needed to decrypt the ECM message as well as a key Ki associated with the identity of the mini disc reader and, more particularly, with the access control module 42 which possesses the equivalent decryption key. The key Kt (and other data, if desired) is encrypted by the key Ki and the resulting EMM message 52 sent via the server 52 to the decoder 13.

The communication of identity of the decoder 13 to the server 15 is not needed in the encryption/decryption process but may be used in the eventual billing to the customer of his purchase of his piece of music.

The EMM and the data to be recorded (as downloaded by the decoder from the MPEG broadcast stream) are sent via the bus 1394 to the mini disc/reader recorder 41. As will be appreciated, the EMM message, the data to be recorded and the associated ECM are all sent in encrypted or scrambled form on the bus 40 and are unreadable to any third party not possessing the keys Kt, Ki.

The data transmitted to the mini disc reader 41 are thereafter combined at 47 and recorded on the disc 43 in the form shown in FIG. 4. In particular, each recording comprises a header 60 containing general information regarding the recording, an EMM section 61 containing the EMM, and one or more sections 62 containing the scrambled audio data segments each with the associated ECM containing the control word necessary to descramble the data.

As mentioned above, in this embodiment, the piece of music to be recorded is transmitted continuously in a transmission cycle. In order to enable the decoder 13 to start downloading the piece at any time once it has been selected by the user, the mini disc device 41 may additionally be supplied with a buffer type memory 46. The individual segments making up the piece of music may be downloaded in any order (for example, starting in the middle of the piece) and thereafter re-arranged in the correct order to be recorded on the disc 43 in the correct order together with the EMM message as shown in FIG. 4.

When replaying the recording, the access control module will decrypt the EMM, using its equivalent of the key Ki, and thus obtain the equivalent of the key Kt associated with the encryption of the ECMs. Each ECM is then decrypted with the equivalent key Kt to obtain the control word needed to descramble that segment of audio data. The algorithms used to generate the keys Kt, Ki and their equivalent may correspond to any known symmetric algorithm such as, for example, DES. Alternatively, in some cases public/private key pairs such as are known from the RSA algorithm may be used.

As mentioned above, in view of the relatively low data rate associated with audio information, all these operations, including the descrambling itself, may be carried out within a single chip. Alternatively, some or part of the process may be carried out separately. For example, the access control module may simply supply a decrypted control word stream in association with the scrambled audio data to a separate descrambler unit.

The use of a control word adapted to change every 10–15 seconds is a concept known from the field of television broadcasts. In the present case and given that the average length of a scrambled piece of music may be only 3–4 minutes, the structure may be simplified, for example, to have only a single control word and ECM for any given piece of music.

It is even possible to imagine a situation in which the use of an EMM is dispensed with and the server 15 sends in clear the key Kt necessary to decrypt a given piece of music in response to a request from the decoder. For obvious reasons, the security of such a system would be extremely low, since all information needed to decrypt a piece of music would be present in clear in transmission or as recorded on the disc 43, and such an embodiment would deter only the most basic level of fraud.

As described, an EMM is requested by a command from the decoder 13 to the server 15 and unit 15 and returned by the same modem channel. As will be appreciated, other communication channels may be used. For example, the user may command an EMM via the telephone or Minitel, and the EMM may be generated and sent, for example, in the MPEG flow via the satellite link.

The embodiment of FIGS. 3 and 4 relies on the principle of association of a key Kt with a particular set of data or piece of music and the communication of this key for example in a specific EMM generated in response to a request. FIGS. 5 and 6 show an alternative embodiment, again using the cyclical transmission of the audio data, but based on the principle of subscription together with the use of a number of predetermined credits.

In this embodiment, the connection between the decoder 13 and the server 15 and unit 30 is not shown, since the mini disc reader 41 receives (upon connection to the decoder 13) a regularly transmitted EMM message containing the exploitation key Ke needed to decode that month's ECMs (i.e. the ECMs associated with all the pieces transmitted during that month) together with a number of credits. If unused, credits transmitted with EMMs may be carried over from one month to the next.

In alternative embodiments, the credits may be loaded into the decoder or reader via a modem, telephone or Minitel connection, or even directly using an "electronic purse" chip-based device such as a smart card to recharge the credits.

Equally, whilst it is desirable for security reasons to have a changing monthly exploitation key Ke, this may alternatively correspond to a predetermined fixed value known to all readers. In such an embodiment, there will be no need for a monthly EMM message.

In the case of a changing monthly exploitation key Ke, the key Ke is encrypted by the key Ki associated with a particular reader 41 to create an EMM. Upon connection to the decoder 13, the EMM message for that month and associated with that reader 41 is recorded on the disk 43 together with the ECM messages relating to the chosen piece of music and the data. See FIG. 6, where the numeral 63 designates the EMM message recorded in this embodiment and 62 designates the data and associated ECM messages.

The transmission of an EMM assigned to a particular reader will of course depend on the user having taken the necessary steps to purchase the rights to download data for recordal. This may be handled, for example, in a subscription system of the type described in relation to FIGS. 1 and 2, where the access control system 15 manages the list of subscribers or, more specifically, a list of decoders designated to receive certain broadcast programs.

Upon replaying the recording, the access control module 42 decrypts the EMM using its equivalent key Ki, obtains the key Ke associated with the ECM for recordings in that month and thereafter decrypts individual ECM messages to obtain the control word to descramble each segrnent.

Since it is envisaged that many titles or pieces of music will be sent during a given month, and that a user may not have unlimited rights to record all titles, it may be necessary to use a credit system to monitor the number of recordings that may be made and/or the number of times the or each recording may be replayed. As noted above, this may take the form of a number of credits stored in the reader and decremented each time the reader records a piece of music comprising the scrambled data, ECMs and EMM message on a disk. In addition, or alternatively, credits may be decremented each time a recording is replayed.

In addition to a credit system some means may also be provided to verify that a reader has the rights to access a particular recording, since all recordings for that month for that decoder will possess the same EMM header. Whilst the presence of an EMM reader on the recording should normally mean that the reader has paid for that recording, fraud may be possible.

For example, it may be envisaged that a user records scrambled data, ECMs and EMMs in one valid and paid-for recording and thereafter "cut and pastes" the EMM header onto all other recordings for that month made without authorisation and simply comprising the scrambled data and ECM messages. Since the exploitation key is constant during that month, the same EMM header will work (at least for that reader) for all recordings during the month. The problem will be exacerbated in the case of a constant unchanging exploitation key.

To overcome this potential problem, the device 41 may be adapted to record in the access control module 42 further information regarding each individual recording that has been purchased, for example, title data or the like. This data may also be contained in one or more ECMs transmitted with the piece of music. Using an EEPROM memory of 4000 bytes, the access control module 42 can stock information relating to up to 1000 recordings, and by comparing a title in the list to the title contained in an ECM on the recording decide upon playback whether a recording has been validly made.

Price information for the piece of music or programme may equally be included in the ECM. Again, this information may be used by the access control module 42 to manage the number of recordings that may be made by a given user. Alternatively or in addition, the credit system may operate on playback of a recording.

Whilst the embodiment of FIGS. 5 and 6 avoids the need to generate in real-time a specific EMM in response to a user request, the memory space requirements of the access control module 42 may increase greatly if detailed lists of recordings purchased are stored in the reader. In an alternative realisation, this information could be stored and managed within the decoder 13. If so, two sets of keys may be used; one to encrypt/decrypt EMM transmissions from the transmitter 6 to decoder 13, and one to re-encrypt EMM messages for subsequent routing to and decryption by the recorder device 41.

Figure 7:
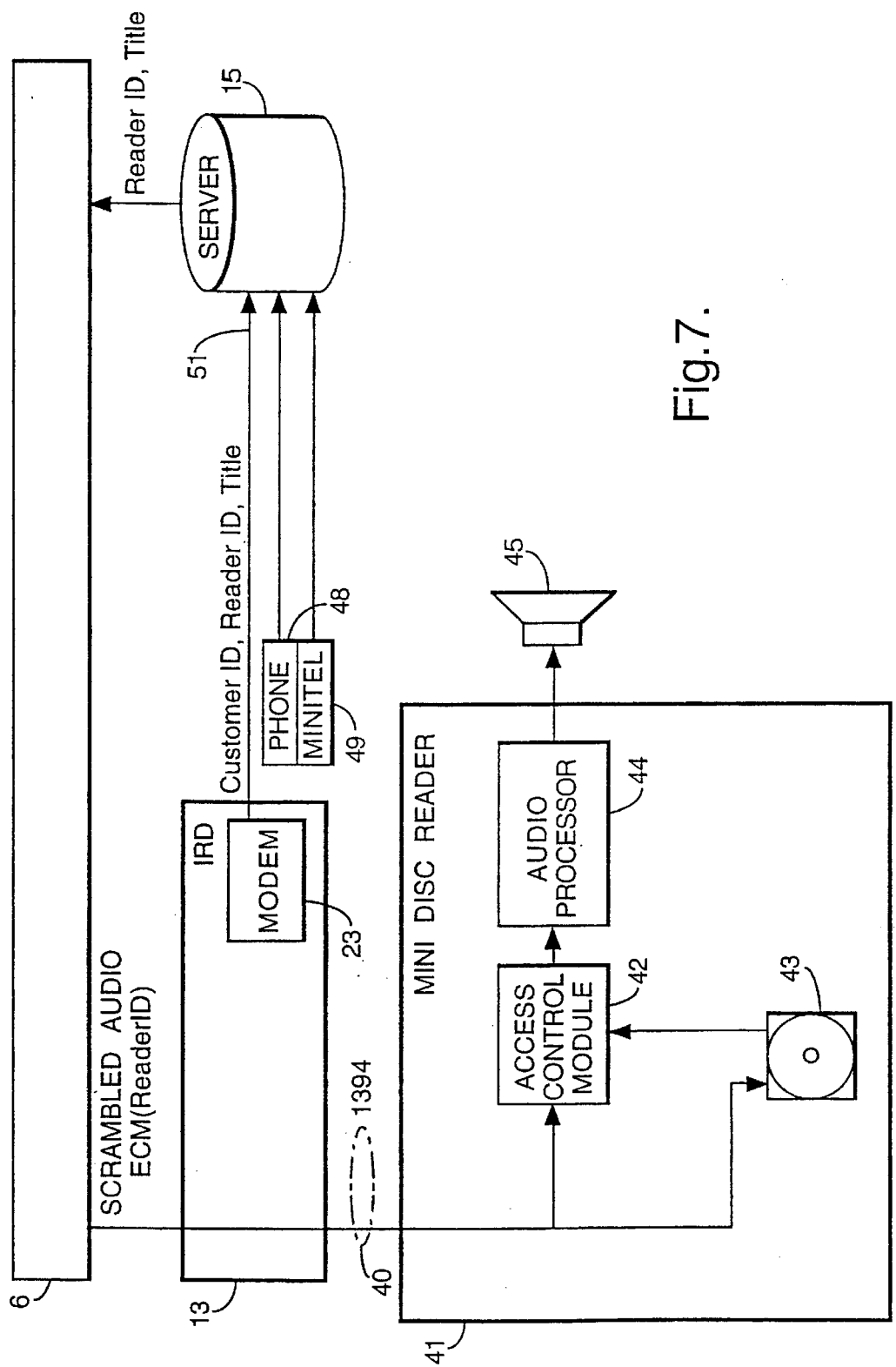
FIG. 7 shows a third embodiment of the embodiment in which data is supplied on demand.

Referring now to FIGS. 7 and 8, a simpler embodiment of the present invention will now be described. In this embodiment, a user who wishes to download and record a piece of music sends a request including the disc reader ID, the title of the piece of music and the decoder ID to a server 15. This request may be effected, for example, via the modern of the decoder 23. Equally, a request may be sent using a phone 48 or minitel 49.

Unlike previous embodiments, the piece of music is not broadcast cyclically but, instead, is only broadcast in response to an instruction from the server 15 to the transmitter 6. The transmitter scrambles the data prior to transmission with a changing control word and encrypts each control word (and other data, if desires) with a key Ki associated with the reader ID or, more specifically, the access control module 42, to prepare a user specific ECM. As before, the decoder ID is merely used for the purpose of billing the user.

In this embodiment, the information to be recorded on the disk 43 is considerably reduced, as shown in FIG. 8, and comprises simply a header 60 and a series of ECMs 64. Upon reading a recording, the access control module 42 uses its equivalent of the key Ki to decode each ECM and to obtain the control word needed to decode each data segment associated with the ECM.

What is claimed is:

1. A system for transmission and recording of digital data, comprising:

a transmission means adapted to prepare and transmit at least one control word encrypted by a first key together with digital data scrambled by that control word;

a digital recording device adapted to receive and record on a digital support the transmitted scrambled digital data together with the encrypted control word, the digital recording device including an access control unit adapted to decrypt the encrypted control word and thereafter descramble the scrambled digital data during playback, wherein said access control module comprises a credit unit adapted to control a number of recordings made by the digital recording device.

2. A system as claimed in claim 1 in which the access control unit is incorporated in a discrete module insertable in the recording device to permit decryption and descrambling of the recorded data upon playback.

3. A system as claimed in claim 1 further comprising a separate receiver/decoder adapted to receive the transmitted digital data and encrypted code word and to communicate this information to the recording device for subsequent recordal.

4. A system as claimed in claim 1 in which the transmission means is adapted to repetitively transmit the scrambled digital data and encrypted code word.

5. A system as claimed in claim 1 in which the control word for the data is encrypted by a first key associated with the identity of the data being transmitted.

6. A system as claimed in claim 5 in which the first key is encrypted by a second key before communication to the access control unit.

7. A system as claimed in claim 5 further comprising a key encryption apparatus adapted to encrypt the equivalent first key by a second key before communication to recording device, the access control unit possessing an equivalent of the second key so as to permit the decryption of the first key and, thereafter, the decryption of the control word and subsequent descrambling of the transmitted data.

8. A system as claimed in claim 7, further comprising a receiver/decoder unit adapted to request a first key from the key encryption apparatus, the key encryption apparatus thereafter communicating the encrypted first key to the receiver/decoder for subsequent communication to the recording device and access control module.

9. A system as claimed in claim 1, the access control module comprising a credit unit for controlling the number of times a recording is played.

10. A system as claimed in claim 1 in which the same first key is used to encrypt the control word or words associated with a plurality of sets of data.

11. A system as claimed in claim 1 in which the first key is repetitively transmitted by the transmission means in a message encrypted by a second key.

12. A system as claimed in claim 11, in which the message sent by the transmission means containing the encrypted first key also contains credit information intended for a credit unit within the access control module.

13. A system as claimed in claim 1 in which the transmission means responds to a real-time request to transmit the scrambled digital data and encrypted control word.

14. A system as claimed in claim 13 in which the control word is directly encrypted by a first key associated with the identity of the access control unit, the access control unit possessing an equivalent of the key to permit the decryption of the control word and subsequent descrambling of the data.

15. A system as claimed in claim 1 in which the transmission means is adapted to transmit audio data.

16. A system as claimed in claim 15 in which the recording device comprises a mini disc recorder adapted to include access control means.

17. A recording device for use in the system as claimed in claim 1, adapted to record scrambled data and an associated encrypted control word and comprising an access control means adapted to decrypt the recorded control word and descramble data upon playback.

18. A system for transmission and recording of digital data as claimed in claim 1, wherein said encrypted control word is transmitted within entitlement control messages and wherein said access control module controls the number of recordings made by the digital recording device as a function of price information included in said entitlement control messages.

19. A method of transmission and recordal of digital data, comprising:

preparing and transmitting digital data together with at least one control word using a transmission means;

recording the transmitted scrambled data and encrypted control word on a digital support using a digital recording device, the digital recording device comprising an access control means;

decrypting the encrypted control word and thereafter descramble the scrambled digital data during playback using the access control means, wherein said access control module comprises a credit unit for controlling a number of recordings made by the digital recording device.

* * * * *

UNITED STATES PATENT AND TRADEMARK OFFICE
CERTIFICATE OF CORRECTION

PATENT NO. : 6,714,650 B1
DATED : March 30, 2004
INVENTOR(S) : Michel Maillard et al.

It is certified that error appears in the above-identified patent and that said Letters Patent is hereby corrected as shown below:

<u>Title page,</u>
Item [30], Foreign Application Priority Data, change "Feb. 13, 1998 (FR) 98400344" to -- Feb. 13, 1998 (EP) 98400344 --.

Signed and Sealed this

Sixth Day of July, 2004

JON W. DUDAS
*Acting Director of the United States Patent and Trademark Office*